United States Patent
Uchikawa

(10) Patent No.: US 10,129,419 B2
(45) Date of Patent: Nov. 13, 2018

(54) IMAGE FORMING APPARATUS, CONTROL METHOD THEREFOR, AND STORAGE MEDIUM

(71) Applicant: CANON KABUSHIKI KAISHA, Tokyo (JP)

(72) Inventor: Hiroshi Uchikawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/145,104

(22) Filed: May 3, 2016

(65) Prior Publication Data

US 2016/0248925 A1    Aug. 25, 2016

Related U.S. Application Data

(62) Division of application No. 13/966,371, filed on Aug. 14, 2013, now abandoned.

(30) Foreign Application Priority Data

Aug. 21, 2012 (JP) ................................. 2012-182542

(51) Int. Cl.
*G06K 15/02* (2006.01)
*H04N 1/00* (2006.01)
*G06F 11/07* (2006.01)

(52) U.S. Cl.
CPC ..... *H04N 1/00408* (2013.01); *G06F 11/0733* (2013.01); *H04N 2201/0006* (2013.01);
(Continued)

(58) Field of Classification Search
None
See application file for complete search history.

(56) References Cited

U.S. PATENT DOCUMENTS 5,602,625 A  *  2/1997  Okamoto ............... G03G 15/55
                                                                        399/21
6,744,998 B2    6/2004  McIntyre
(Continued)

FOREIGN PATENT DOCUMENTS

JP    2005080056 A    3/2005
JP    2006317919 A    11/2006
(Continued)

OTHER PUBLICATIONS

Office Action issued in Japanese Appln. No. 2012-182542 dated Dec. 20, 2016.
(Continued)

*Primary Examiner* — Huo Long Chen
(74) *Attorney, Agent, or Firm* — Rossi, Kimms & McDowell LLP

(57) ABSTRACT

An image forming apparatus which is capable of appropriately replaying movies to be displayed to the user. The image forming apparatus stores combinations of a plurality of movies for a plurality of maintenance procedures of the image forming apparatus and orders of replay for the plurality of movies according to each type of the plurality of maintenance procedures, specifies a type of the maintenance procedure to be executed to the image forming apparatus, and acquires a plurality of movies corresponding to the type of the specified maintenance procedure based on the stored information and replays the acquired movies as a series of movies according to the orders of relay.

22 Claims, 7 Drawing Sheets

(52) U.S. Cl.
CPC ............... *H04N 2201/0091* (2013.01); *H04N 2201/0094* (2013.01)

(56) References Cited

U.S. PATENT DOCUMENTS

| | | | |
|---|---|---|---|
| 2004/0057743 A1* | 3/2004 | McIntyre | G03G 15/5016 399/81 |
| 2008/0047448 A1* | 2/2008 | Cocklin | G03G 15/70 101/483 |
| 2008/0048390 A1 | 2/2008 | Gutierrez-Vazquez et al. | |
| 2008/0278753 A1 | 11/2008 | Oda et al. | |
| 2009/0132585 A1* | 5/2009 | Tanis | G09B 5/00 |
| 2010/0257414 A1* | 10/2010 | Peters | G03G 15/221 714/57 |
| 2011/0149330 A1* | 6/2011 | Do | G06K 15/002 358/1.14 |
| 2011/0167347 A1* | 7/2011 | Joo | G06F 3/04847 715/716 |
| 2011/0175901 A1 | 7/2011 | Meunier et al. | |
| 2013/0013465 A1 | 1/2013 | Scheinfeld et al. | |
| 2013/0197899 A1 | 8/2013 | Roulland et al. | |

FOREIGN PATENT DOCUMENTS

| | | |
|---|---|---|
| JP | 2008136759 A | 6/2008 |
| JP | 2008162061 A | 7/2008 |
| JP | 2008-282217 A | 11/2008 |
| JP | 2010278986 A | 12/2010 |

OTHER PUBLICATIONS

Office Action issued in Japanese Application No. JP2012182542 dated May 24, 2016.
Office Action issued in U.S. Appl. No. 13/966,371 dated Oct. 30, 2014.
Office Action issued in U.S. Appl. No. 13/966,371 dated Mar. 26, 2015.
Office Action issued in U.S. Appl. No. 13/966,371 dated Oct. 7, 2015.
Office Action issued in U.S. Appl. No. 13/966,371 dated Mar. 3, 2016.
"CD/DVD Player" Sony Corporation, DVP-SR200P, 4-115-660-11(1), (2008). Web. Oct. 30, 2014. https://docs.sony.com/release/DVPSR200P_US_ES.pdf.

* cited by examiner

| MAINTENANCE ID | MOVIE LIST |
|---|---|
| 1 | A1,A2,A4 |
| 2 | A1,A3,A4 |
| 3 | B1,B2,B3,B4,B14 |
| 4 | B1,B5,B6,B7,B14 |
| 5 | B1,B8,B9,B10,B14 |
| 6 | B1,B11,B12,B13,B14 |

| MOVIE ID | MOVIE FILE | REPLAY TIME | END DETERMINATION CONDITION |
|---|---|---|---|
| A1 | /movie/A1.mpeg | 0:30 | RIGHT COVER OPEN |
| A2 | /movie/A2.mpeg | 1:00 | |
| A3 | /movie/A3.mpeg | 1:30 | |
| A4 | /movie/A4.mpeg | 0:20 | |
| B1 | /movie/B1.mpeg | 0:30 | TONER COVER OPEN |
| B2 | /movie/B2.mpeg | 0:20 | |
| B3 | /movie/B3.mpeg | 1:00 | |
| B4 | /movie/B4.mpeg | 0:30 | |
| B5 | /movie/B5.mpeg | 0:20 | |
| B6 | /movie/B6.mpeg | 1:00 | |
| B7 | /movie/B7.mpeg | 0:30 | |
| B8 | /movie/B8.mpeg | 0:20 | |
| B9 | /movie/B9.mpeg | 1:00 | |
| B10 | /movie/B10.mpeg | 0:30 | |
| B11 | /movie/B11.mpeg | 0:20 | |
| B12 | /movie/B12.mpeg | 1:00 | |
| B13 | /movie/B13.mpeg | 0:30 | |
| B14 | /movie/B14.mpeg | 0:30 | |

IMAGE FORMING APPARATUS, CONTROL METHOD THEREFOR, AND STORAGE MEDIUM

BACKGROUND OF THE INVENTION

Field of the Invention

The present invention relates to an image forming apparatus, a control method therefor, and a program.

Description of the Related Art

Conventionally, an image forming apparatus is proposed, which is adapted to present movies of a method of maintenance, such as removal of a jam, replacement of a toner cartridge, and supply of staples. The movies allow the user to more smoothly carry out the maintenance based on high expressiveness and abundant information of the movies.

The image forming apparatus includes a high-capacity storage device such as an HDD, and a plurality of movies according to the contents of the maintenance method are stored in the storage device, as part of a product.

Other than the format of storing the movies in the storage device of the image forming apparatus, a format of storing the movies in a separate device, such as a server, is also proposed (see Japanese Laid-Open Patent Publication (Kokai) No. 2008-282217, for example).

In this format, a necessary movie is downloaded from a server through a network and displayed when the image forming apparatus requires maintenance.

One movie is prepared for each content of the maintenance method of the image forming apparatus.

For example, movies for removing a jam include contents of an operation of opening a door provided on a housing of the image forming apparatus to access the jammed part of the image forming apparatus, removing the jammed sheet, and closing the door.

Other than for removing the jam, the procedure of opening the door is also necessary in a toner replacement process.

However, if the movie of the toner container replacement or the jam removal process is replayed without the user opening the door, there is a gap between the procedure that should be executed by the user and the procedure of the replayed movie.

A sequence for removing a jammed sheet may be set in the removal of the jam. However, if the movie is simply replayed without regard for the sequence and the user follows the procedure of the movie, the sheet may be damaged.

Meanwhile, if only a currently operable movie is replayed, the gap in the procedures or the damage of sheet can be eliminated; however, the whole picture of the maintenance cannot be glimpsed, and the user feels a sense of anxiety.

SUMMARY OF THE INVENTION

The present invention provides an image forming apparatus which is capable of appropriately replaying movies to be displayed to the user, a control method therefor, and a storage medium.

In an aspect of the present invention, there is provided an image forming apparatus comprising: a storage unit configured to store combinations of a plurality of movies for a plurality of maintenance procedures of the image forming apparatus and orders of replay for the plurality of movies according to each type of the plurality of maintenance procedures; a specifying unit configured to specify a type of the maintenance procedure to be executed to the image forming apparatus; and a replaying unit configured to acquire a plurality of movies corresponding to the type of the maintenance procedure specified by the specifying unit based on information stored by the storage unit, and replay the acquired movies as a series of movies according to the orders of relay.

According to the present invention, it is possible to appropriately replay movies to be displayed to the user.

Further features of the present invention will become apparent from the following description of exemplary embodiments with reference to the attached drawings.

BRIEF DESCRIPTION OF THE DRAWINGS

FIGS. 4A and 4B are views showing a movie list table and a movie table stored in a storage in FIG. 1, respectively.

DESCRIPTION OF THE EMBODIMENTS

An embodiment of the present invention will now be described in detail with reference to the drawings.

Figure 1:
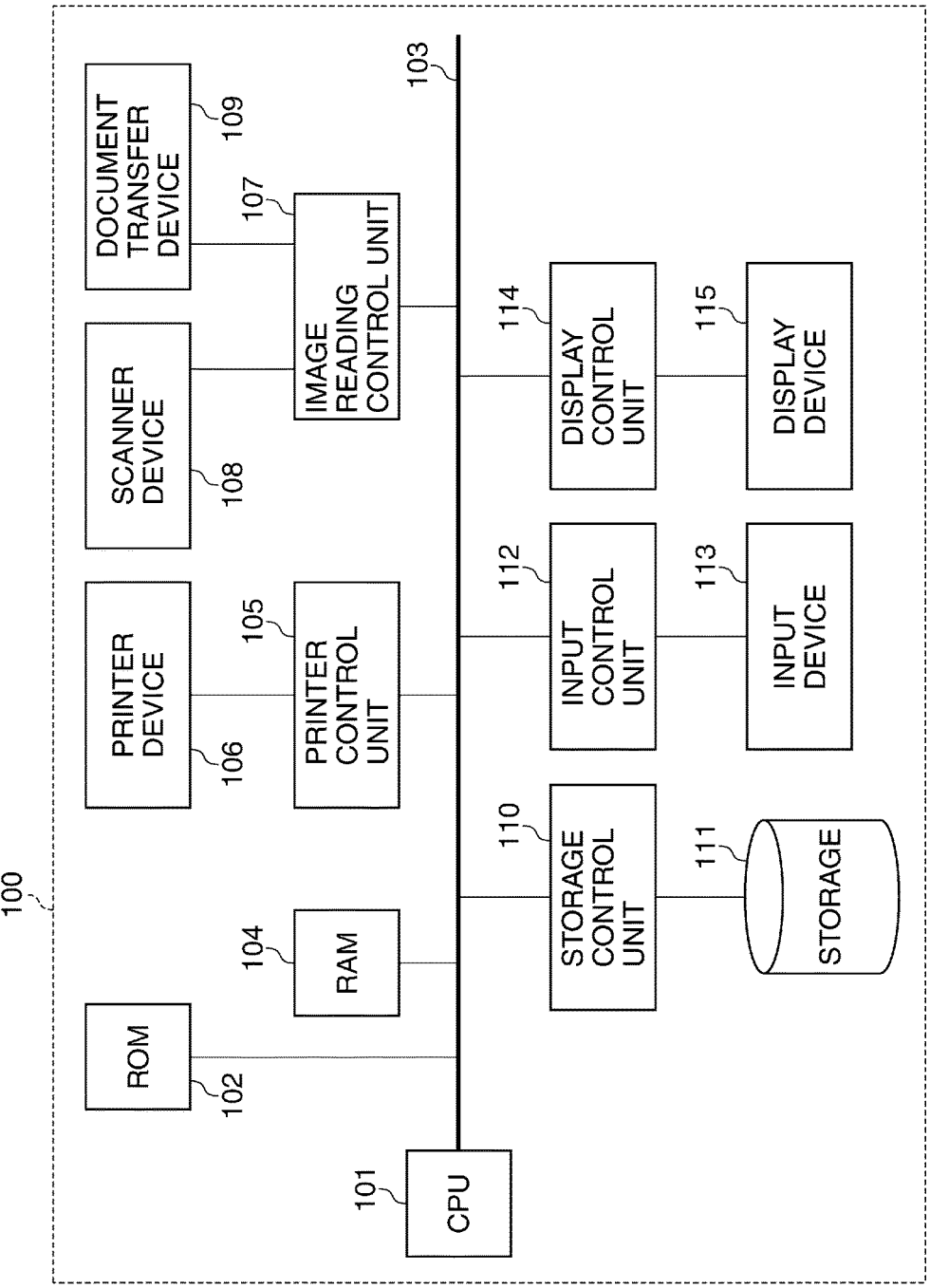
FIG. 1 is a view schematically showing an arrangement of an image forming apparatus according to an embodiment of the present invention.

FIG. 1 is a view schematically showing an arrangement of an image forming apparatus 100 according to an embodiment of the present invention.

In FIG. 1, the image forming apparatus 100 includes a CPU 101, a ROM 102, a RAM 104, a printer control unit 105, an image reading control unit 107, a storage control unit 110, an input control unit 112, and a display control unit 114, which are connected to one another through a bus 103.

The image forming apparatus 100 also includes a storage 111, a printer device 106, a scanner device 108, a document transfer device 109, an input device 113, and a display device 115.

The CPU 101 controls the entire image forming apparatus 100. The CPU 101 activates an OS (operating system) by a boot program stored in the ROM 102. On the OS, the CPU 101 executes programs stored in the storage 111.

The RAM 104 is used as a main memory or a temporary storage area, such as a work area, of the CPU 101. When the CPU 101 executes a program, the CPU 101 reads the program from the storage 111 and stores the program in the RAM 104.

The printer control unit 105 controls the printer device 106 to print an image on a sheet such as paper. The printer device 106 prints an image on a sheet.

The image reading control unit 107 controls the scanner device 108 to generate image data. The image reading control unit 107 controls the document transfer device 109, which is an ADF (Automatic Document Feeder), to transfer each piece of a document mounted on a document holder of the document transfer device 109 to the scanner device 108 to generate image data.

The scanner device 108 uses an optical reading apparatus, such as a CCD, to scan the document and converts image information of the document to electrical signal data.

The storage 111 is a read-write non-volatile storage device, such as an HDD. The storage 111 stores a controller program for controlling the entire image forming apparatus 100, a program for executing a procedure display process described later, various application programs, and various data such as movies showing maintenance procedures. The CPU 101 executes the programs. The storage control unit 110 controls the storage 111.

The input control unit 112 receives an operation instruction of the user from the input device 113, such as a touch panel and a hardware key. The display control unit 114 controls the display device 115, which is a display unit such as an LCD and a CRT, to display an operation screen or a movie to the user.

Figure 2:
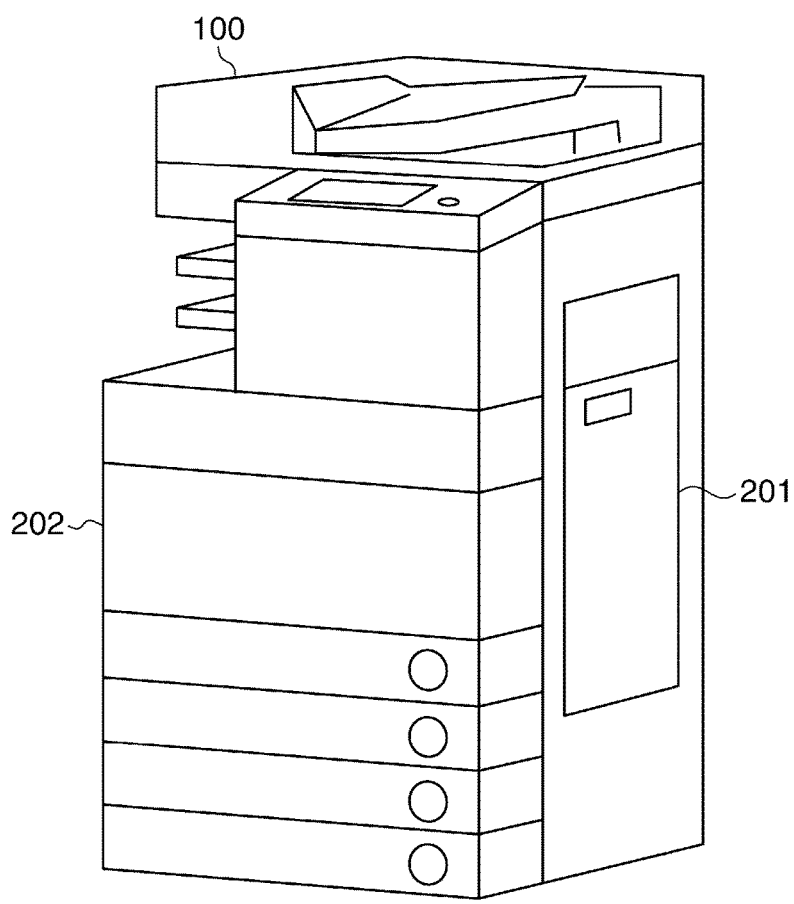
FIG. 2 is a view showing an appearance of the image forming apparatus of FIG. 1.

FIG. 2 is a view showing an appearance of the image forming apparatus 100 of FIG. 1.

FIG. 2 shows a right cover 201 and a toner cover 202 disposed on the image forming apparatus 100.

The right cover 201 is arranged to expose a transfer path of sheets to remove a jammed sheet. The toner cover 202 is arranged to expose a toner container mount section to replace a toner.

The image forming apparatus 100 includes sensors adapted to sense whether the right cover 201 and the toner cover 202 are open or closed, respectively.

Figure 3:
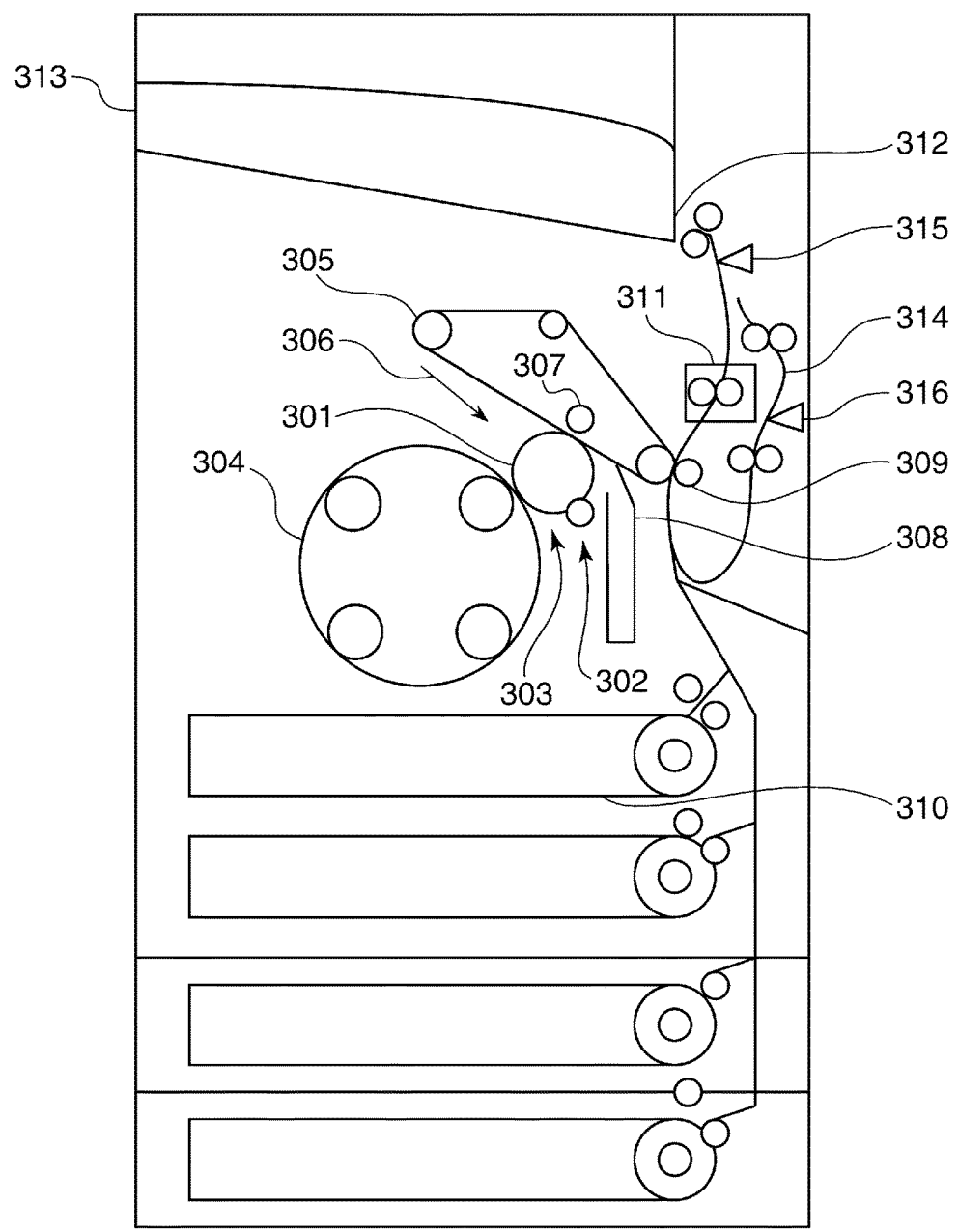
FIG. 3 is a sectional view showing an internal structure of the image forming apparatus of FIG. 1.

FIG. 3 is a sectional view showing an internal structure of the image forming apparatus 100 of FIG. 1.

FIG. 3 shows the internal structure of the image forming apparatus 100, which is a full-color image forming apparatus of CMYK (cyan, magenta, yellow, and black), for example.

A photosensitive drum 301 is charged by a primary charge 302 at a specific polar potential, and exposed by an exposure unit not shown at a location thereof indicated by an arrow 303 according to an instruction from the CPU 101. In this way, an electrostatic latent image corresponding to K (black) is formed, for example.

A rotary developer 304 includes four developers integrated with toner cartridges. After the formation of the electrostatic latent image, one of the developers of the rotary developer 304 develops an image corresponding to K (black) on the photosensitive drum 301.

An intermediate transfer belt 305 is driven in a direction indicated by an arrow 306. The image corresponding to K (black) developed on the photosensitive drum is transferred to the intermediate transfer belt 305 by an electric field formed by a primary transfer roller 307, as the image passes through a joint between the photosensitive drum 301 and the intermediate transfer belt 305.

cleans The surface of the photosensitive drum 301 finished with the transfer to the intermediate transfer belt 305 is cleaned by a cleaning apparatus 308. This process is sequentially repeated to place four color images on top of each other on the intermediate transfer belt to form a color image. The transfer process is executed just once to form a monochrome image.

The image transferred to the intermediate transfer belt 305 is printed on a sheet fed from a cassette 310 by a secondary transfer roller 309. The fixing unit 311 heats and fixes the sheet on which the image is printed.

After the fixation, a roller 312 transfers the sheet to a discharge port 313 to discharge the sheet. For double-sided printing, the sheet is circulated through an inversion path 314, followed by the printing process being repeated.

A discharge section sensor 315 and a double-sided section sensor 316 are adapted to sense the presence or absence of a print sheet. The sensors sense generation of a jam. Mechanical flags or optical elements may be used for the sensors.

FIGS. 4A and 4B are views showing a movie list table 400 and a movie table 410 stored in the storage 111 in FIG. 1, respectively.

FIG. 4A is a view showing the movie list table 400. The movie list table 400 is a table associating maintenance IDs and movie lists with each other. The movie list table 400 shows combinations of movies corresponding to a series of predetermined operations executed by the user in the image forming apparatus 100 and shows orders of replay by the display device 115. The series of predetermined actions, such as actions of opening the right cover 201, removing a sheet, and closing the right cover 201, are set for each maintenance ID. When the maintenance ID is 1, for example, the combination of movies includes A1, A2, and A4 shown in the corresponding movie list. The movies are replayed in the written order.

The maintenance IDs are for identifying states that require maintenance in the image forming apparatus 100, specifically, designated as below.

A maintenance ID 1 indicates a state that generation of a transfer section jam is sensed, and the discharge section sensor 315 senses the state.

A maintenance ID 2 indicates a state that generation of a double-sided section jam is sensed, and the double-sided section sensor 316 senses the state.

A maintenance ID 3 indicates a state that replacement of a magenta toner cartridge is necessary, and the printer device 106 senses the state.

A maintenance ID 4 indicates a state that replacement of a cyan toner cartridge is necessary, and the printer device 106 senses the state.

A maintenance ID 5 indicates a state that replacement of a yellow toner cartridge is necessary, and the printer device 106 senses the state.

A maintenance ID 6 indicates a state that replacement of a black toner cartridge is necessary, and the printer device 106 senses the state.

The movie lists will be described next. The movie lists indicate movies to be displayed when the maintenance corresponding to the maintenance ID is necessary.

For example, the movie list corresponding to the maintenance ID 1 includes A1, A2, and A4. This indicates that the movies will be replayed in the order of A1, A2, and A4.

FIG. 4B is a view showing the movie table 410. The movie table 410 is a table associating movie IDs, movie files, replay time, and end determination conditions with one another.

The movie IDs are for identifying the movies, and the movie IDs are also used in the movie lists in the movie list table 400. The movie files indicate file names of the movies to be replayed and locations of the movie files in the storage 111.

The replay time indicates a replay time period from when replay of the movie is started till when the replay of the movie is ended. The end determination conditions indicate conditions of ending the replay of the movies, i.e., conditions of proceeding to relay of the next movie. For example, when the movies are replayed in the order of A1 and A2, the movie of A2 cannot be replayed by ending the replay of the movie of A1, unless the right cover is open.

Operations indicated by the movie files are as follows.

An operation indicated by the movie with the movie ID A1 is an operation of opening the right cover 201. An operation indicated by the movie with the movie ID A2 is an operation of removing a jammed sheet near the discharge section sensor 315. An operation indicated by the movie with the movie ID A3 is an operation of removing a jammed sheet near the double-sided section sensor 316. An operation indicated by a movie with the movie ID A4 is an operation of closing the right cover 201.

An operation indicated by the movie with the movie ID B1 is an operation of opening the toner cover 202. An operation indicated by the movie with the movie ID B2 is an operation of taking out an empty magenta toner cartridge. An operation indicated by the movie with the movie ID B3 is an operation of preparing a new magenta toner cartridge.

An operation indicated by the movie with the movie ID B4 is an operation of mounting a new magenta toner cartridge. An operation indicated by the movie with the movie ID B5 is an operation of taking out an empty cyan toner cartridge. An operation indicated by the movie with the movie ID B6 is an operation of preparing a new cyan toner cartridge.

An operation indicated by the movie with the movie ID B7 is an operation of mounting a new cyan toner cartridge. An operation indicated by the movie with the movie ID B8 is an operation of taking out an empty yellow toner cartridge. An operation indicated by the movie with the movie ID B9 is an operation of preparing a new yellow toner cartridge.

An operation indicated by the movie with the movie ID B10 is an operation of mounting a new yellow toner cartridge. An operation indicated by the movie with the movie ID B11 is an operation of taking out an empty black toner cartridge.

An operation indicated by the movie with the movie ID B12 is an operation of preparing a new black toner cartridge. An operation indicated by the movie with the movie ID B13 is an operation of mounting a new black toner cartridge. An operation indicated by the movie with the movie ID B14 is an operation of closing the toner cover 202.

In this way, the movie is provided for each of various operations by the user in the image forming apparatus 100. If a predetermined condition is not met during the replay of a movie with a condition which is a specific movie among the movies (A1 and B1 in FIGS. 4A and 4B), a movie to be replayed following the movie with the condition indicated in the order is not replayed.

The storage 111 corresponds to a storage unit adapted to store movies that are provided for various operations executed by the user in the image forming apparatus 100 and that are replayed by the display device 115 during the operations by the user.

Figure 5A:
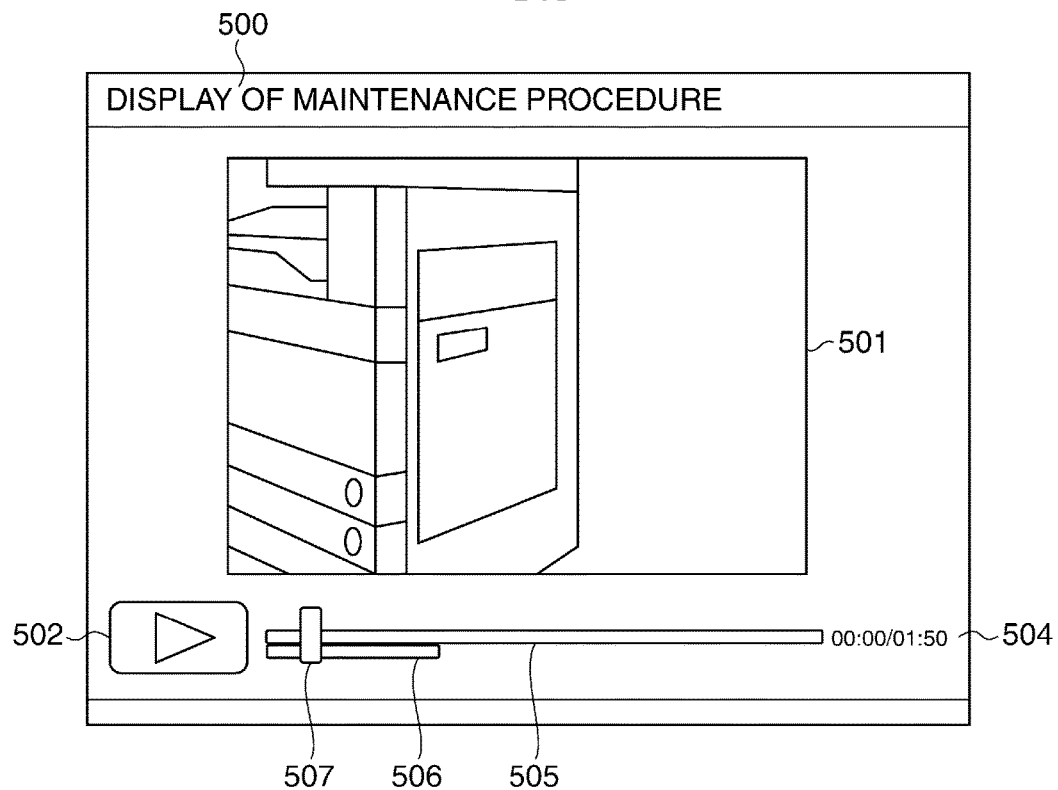
FIGS. 5A and 5B are views showing an example of a screen displayed on a display device in FIG. 1.
Figure 5B:
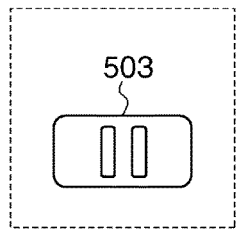

FIGS. 5A and 5B are views showing an example of a screen displayed by the display device 115 in FIG. 1.

In a screen 500 of FIG. 5A, the CPU 101 executes the controller program stored in the storage 111 to generate display data and causes the display device 115 to display the display data through the display control unit 114.

The screen 500 shows a movie display area 501, a replay button 502, a replay time display label 504, an overall display 505, a movable range display 506, a lever 507, and a pause button 503.

The movie display area 501 is for displaying a movie for presenting a maintenance procedure. Movies corresponding to the maintenance procedure are replayed.

The replay button 502 is for instructing replay of a terminated movie. The replay of the movie is started when the replay button 502 is pressed. The replay button 502 is not displayed when the replay of the movie is started. Instead, the pause button 503 is displayed at the same display position in the screen 500.

The replay of the movie is temporarily terminated when the pause button 503 is pressed. When the replay of the movie is paused, the replay button 502 is displayed in place of the pause button 503.

The replay time display label 504 indicates replay time of the movie to be replayed and current replay time in the replay time. If there are a plurality of movies to be replayed, the replay time indicates a sum of the replay time.

The overall display 505 schematically indicates the replay time. The lever 507 corresponds to a reception unit for receiving a user's replay instruction of replaying the movie from a location thereof different from a location of the movie being replayed then. Specifically, the lever 507 is a slider for indicating the current replay position and for instructing a movement of the replay position.

The movable range display 506 indicates a movable range of the lever 507, ranging from the left end to the right end of the movable range display 506.

This is because when a movie with an end determination condition is replayed in the replay of a plurality of movies, the next movie cannot be replayed unless the condition is met, and the lever 507 cannot be moved to the range of the next movie. In this way, if the predetermined condition in the movie with the condition is not met, the lever 507 does not receive the user's replay instruction of replaying the movie to be replayed following the movie with the condition.

An example of the actual display when the maintenance ID is 1 will be described. When the maintenance ID is 1, the movies with the movie IDs A1, A2, and A4 are replayed according to the movie list table 400.

The replay time of each movie is 30 seconds (00:30), 1 minute (01:00), and 20 seconds (00:20) according to the movie table 410.

Therefore, the replay time when the maintenance ID is 1 is 1 minute 50 seconds which is a sum of the replay time of the movies to be replayed.

For example, it is assumed that a frame at 20 seconds from the top of the movie with the movie ID A1 replayed firstly is currently displayed. In this case, the replay position time is 20 seconds.

It is assumed that a frame at 10 seconds from the top of the movie with the movie ID A2 replayed secondly is currently displayed. In this case, the replay of the movie with the movie ID A1 is finished; accordingly, the lever 507 is positioned at 40 seconds which is a sum of 30 seconds that is the replay time of A1 and 10 seconds that is replayed time of A2.

The replay time display label 504 displays a character string connecting the calculated replayed time and the replay time with the maintenance ID 1 by a slash in this order. Therefore, "00:40/01:50" is displayed in the example described above.

FIGS. 6A to 6D are views showing an example of movies displayed in the movie display area 501 in FIGS. 5A and 5B.

Figure 6A:
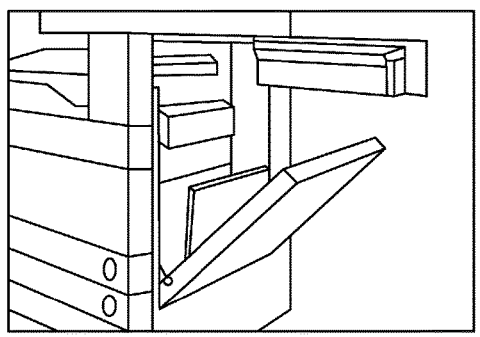
FIGS. 6A to 6D are views showing an example of movies displayed in a movie display area in FIGS. 5A and 5B.

FIG. 6A shows a scene displayed in the movie with the movie ID A1 when the maintenance ID is 1. A transfer section jam is generated when the maintenance ID is 1. The movie with the movie ID A1 displays an operation of opening the right cover 201 in the movie display area 501.

Figure 6B:
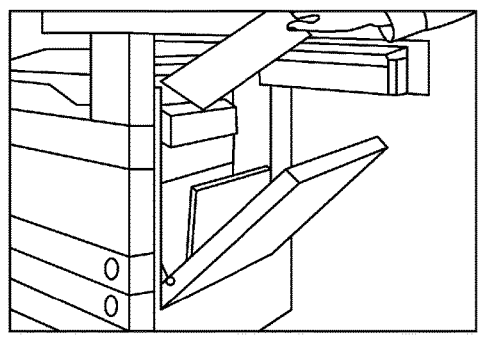

FIG. 6B shows a scene displayed in the movie with the movie ID A2 when the maintenance ID is 1. The movie with the movie ID A2 displays an operation of removing a jammed sheet near the discharge section sensor 315.

Figure 6C:
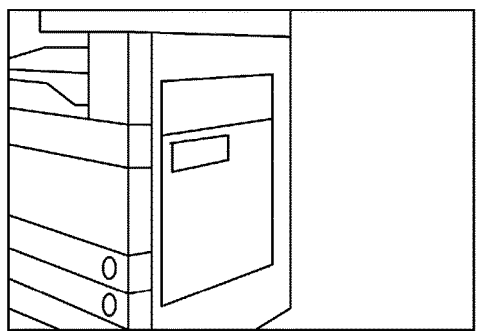

FIG. 6C shows a scene displayed in the movie with the movie ID A4 when the maintenance ID is 1. The movie with the movie ID A4 displays an operation of closing the right cover 201.

Figure 6D:
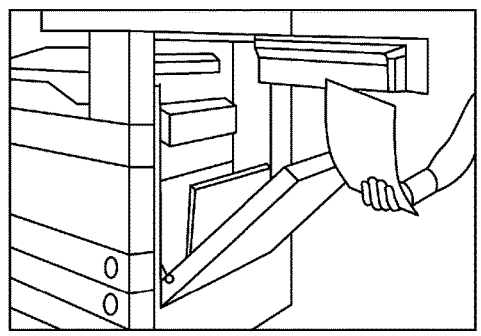

FIG. 6D shows a scene displayed in the movie with the movie ID A3 when the maintenance ID is 2. A double-sided section jam is generated when the maintenance ID is 2. The movie with the movie ID A3 displays an operation of removing a jammed sheet near the double-sided section sensor 316.

Figure 7:
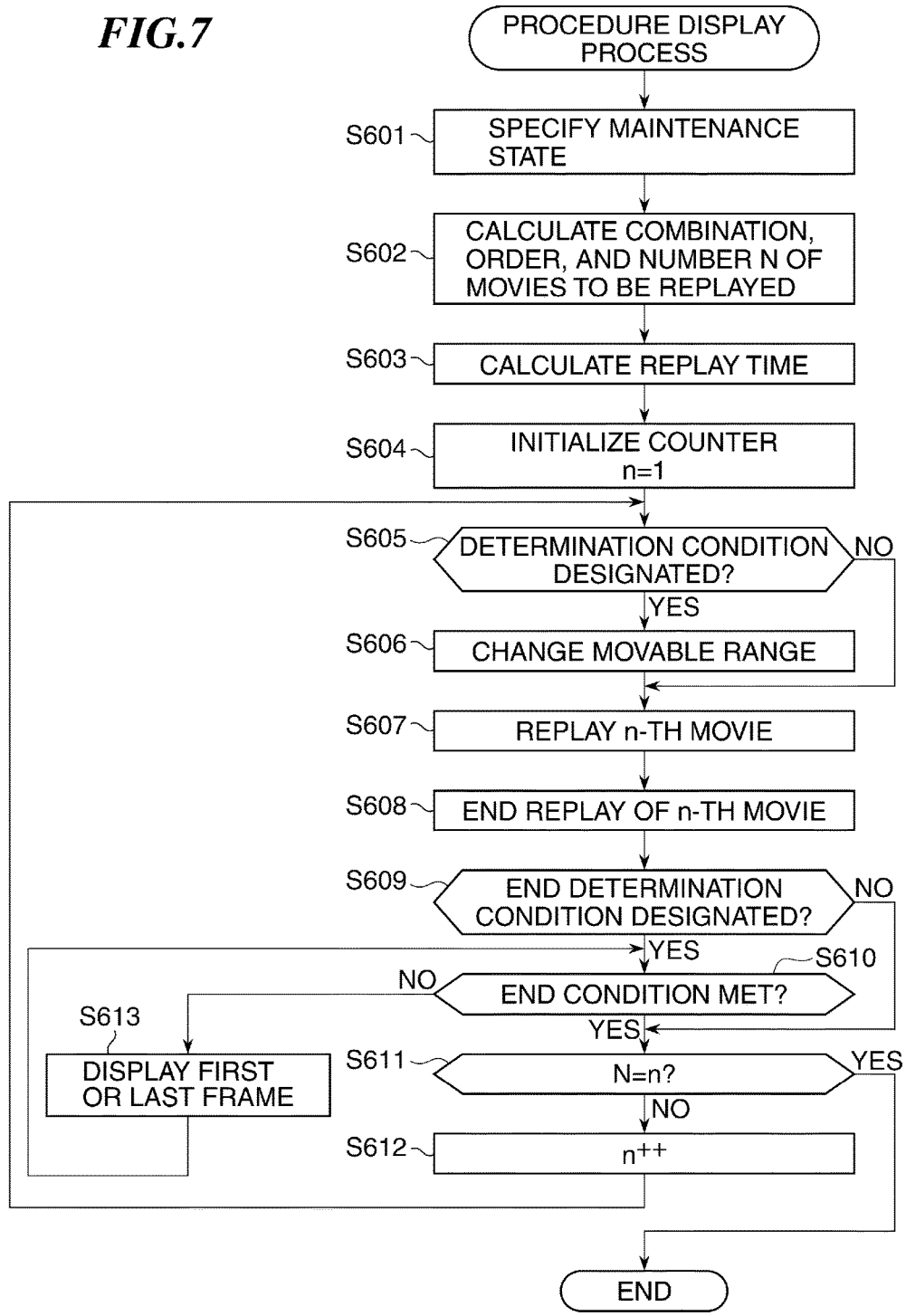
FIG. 7 is a flowchart showing a procedure of a maintenance method-displaying process executed by the image forming apparatus of FIG. 1.

FIG. 7 is a flowchart showing a procedure of a maintenance method-displaying process executed by the image forming apparatus of FIG. 1.

The maintenance method-displaying process of FIG. 7 is started when the printer control unit 105 senses a change in a value indicated by the sensors adapted to sense whether the right cover 201 and the toner cover 202 are open or closed, by the discharge section sensor 315, or by the double-sided section sensor 316.

In FIG. 7, there is first specified a current maintenance state (maintenance ID) of the image forming apparatus 100, i.e., the type of the current maintenance to be executed to the image forming apparatus 100 by the user is specified (step S601). For example, if the value indicated by the discharge section sensor 315 indicates congestion of a sheet, there is specified the maintenance ID to be 1 corresponding to the discharge section jam.

Based on the specified maintenance ID, a combination of movies and an order of replay by the display device 115 are next acquired from the movie list table 400 and the movie table 410, as a storage unit, and the number N of movies to be replayed indicated in the movie list is acquired (step S602), details of which will be described later.

Summation of the replay time of the movies indicated in the movie list causes the replay time to be calculated (step S603), details of which will be described later.

A counter n for counting the number of replayed movies is initialized by "1" (step S604).

Then, it is determined whether an end determination condition is designated in the n-th movie, which is subjected to the current replay, from the movie table 410 (step S605).

As a result of the determination of the step S605, when the end determination condition is not designated in the n-th movie (NO to the step S605), the program proceeds to step S607.

On the other hand, as a result of the determination of step S605, when the end determination condition is designated in the n-th movie (YES to the step S605), the movable range display 506 is changed in length upto a sum of the replay time of the first n movies (step S606).

A file of the n-th movie is read from the storage 111 and stored in the RAM 104, with the movie replayed (step S607). When the replay of the n-th movie is finished (step S608), it is determined whether an end determination condition is designated in the n-th movie (step S609).

As a result of the determination of the step S609, when the end determination condition is not designated (NO to the step S609), followed by the program proceeding to step S611.

On the other hand, as a result of the determination of step S609, when the end determination condition is designated (YES to the step S609), it is determined whether the end determination condition is satisfied (step S610). For example, it is checked whether the right cover 201 is open if the movie ID is A1.

As a result of the determination of the step S610, when the end determination condition is not satisfied (NO to the step S610), the first or the last frame of the n-th movie is displayed (step S613), followed by the program returning to the step S610.

It should be noted that instead of displaying the first or the last frame, a frame other than the first or the last frame may be displayed when the end determination condition is not satisfied (NO to the step S610). For example, a data item can be added to the movie table 410, and a position of the frame to be displayed can be stored for each of the movie IDs, which allows the CPU 101 to specify the frame to be displayed. In this way, when a predetermined condition is not satisfied during the replay of the movie with the condition, the image forming apparatus 100 displays a frame included in the movie with the condition.

When the end determination condition is not satisfied, the movie with the condition may be replayed again, instead of terminating the movie while displaying a frame included in the movie with the condition. In this case, the movie with the condition is repeatedly replayed until the end determination condition is satisfied.

On the other hand, as a result of the determination of the step S610, when the end determination condition is satisfied (YES to the step S610), it is determined whether the number N of movies indicated in the movie list to be replayed and the counter n are identical with each other (step S611).

As a result of the determination of step S611, when the number N and the counter n are not identical with each other (NO to the step S611), the counter n is incremented by 1 (step S612), followed by the program returning to the step S605. The process of the steps S604 to S612 corresponds to a replaying unit adapted to control the display device 115 to acquire, from the storage 111, the movies indicated by the combination to replay the movies according to the order.

On the other hand, as a result of the determination of the step S611, when the number N and the counter n are identical with each other (YES to the step S611), the program is terminated. In this case, when the state that the maintenance is necessary is not solved or when new maintenance is necessary, the maintenance ID is acquired again, followed by the procedure of the process of FIG. 7 being repeated.

According to the process of FIG. 7, the combination of movies corresponding to the series of predetermined operations and the order of replay by the display device 115 are acquired when the user performs the series of predetermined operations in the image forming apparatus 100, and subsequently the display device 115 is controlled to acquire, from the storage 111, the movies indicated by the combination and replay the movies according to the acquired order, which makes it possible to appropriately replay movies to be displayed to the user.

The details of step S602 will be described. In step S602, the CPU 101 searches the movie list table 400 for a line in which the value of the maintenance ID coincides with the maintenance ID acquired in the step S601.

If a coincided line is searched, the movie list in the line is acquired. The movie list is a character string connecting the movie IDs by commas; accordingly, the character string is dissolved with the commas as delimiters, thereby enabling one or more movie IDs to be acquired.

For example, when the maintenance ID is 1, the movie ID list indicates A1, A2, and A4; accordingly, the number N of movies indicated in the movie list to be replayed is 3. The CPU 101 temporarily stores the movie IDs in the RAM 104 as, for example, sequence information in the order indicated in the movie list.

The details of step S603 will be described. The CPU 101 searches for the movie IDs coinciding with the movie IDs to be replayed based on the movie IDs in the movie table 410. The sum is obtained from the replay time corresponding to the coincided movie IDs in the movie table 410. The sum is set as the replay time, and the replay time display label 504 is displayed. It should be noted that in the initial state, the movable range display 506 indicates the same range as the overall display 505.

A format or a codec of the movies are not particularly limited in the embodiment described above, and various forms are possible.

As described above, it is possible to limit a progress in the movie replay when the overall length for the removal needs to be indicated and when the procedure that should be executed by the user and the replay of movie need to be synchronized.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium. In this case, the program code itself read from the storage medium realizes the functions of the embodiment described above, and hence the program code and the storage medium in which the program code is stored constitute the present invention.

Aspects of the present invention can also be realized by a computer of a system or apparatus (or devices such as a CPU or MPU) that reads out and executes a program recorded on a non-transitory memory device to perform the functions of the above-described embodiment(s), and by a method, the steps of which are performed by a computer of a system or apparatus by, for example, reading out and executing a program recorded on a non-transitory memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority the benefit of Japanese Patent Application No. 2012-182542 filed Aug. 21, 2012, which is hereby incorporated by reference herein in its entirety.

What is claimed is:

1. An image processing apparatus comprising:
    a first storage configured to store a plurality of individual movie files prepared for each of operation works to be performed on the image forming apparatus by a user;
    a second storage configured to store information indicating plural sets of combinations of individual movie files to be played and information indicating an order of play of respective individual movie files of each set of combinations of the plural sets of combinations, wherein each set of combinations of the plural sets of combinations is associated with maintenance identifying information for identifying a single maintenance event;
    a processor configured to execute:
    an acquiring task that acquires the individual movie files to be played from among the plurality of individual movie files stored in the first storage and that acquires a total number of the individual movie files to be played, based on the information indicating the set of combination of the individual movie files stored in the second storage in association with the maintenance identifying information for identifying the detected maintenance event;
    a determining task that determines whether a value of a counter is equal to the total number of the individual movie files to be played; and
    a displaying task that displays on a display the acquired individual movie files as a series of movies in order according to the stored order of play of the acquired individual movie files together with a total play time of the acquired individual movie files, the display of the acquired individual movie files as the series of movies ending when it is determined that the value of the counter is equal to the total number of the individual movies files to be played,
    wherein the determining task determines whether the value of the counter is equal to the total number of the individual movies files to be played after an end of replay of each individual movie file of the acquired individual movie files, and the processor is further configured to execute a counting task that increments the value of the counter, after the end of replay of each individual movie file of the acquired individual movie files when it is determined, in the determining task, that the value of the counter is not equal to the total number of the individual movies files to be played.

2. The image processing apparatus according to claim 1, wherein the processor is further configured to execute:
    a calculating task that calculates the total play time of the acquired individual movie files based on the respective play times of the acquired individual movie files,
    wherein the display task displays on the display the total play time of the acquired individual movie files calculated by the calculating task.

3. The image processing apparatus according to claim 2, wherein:
    the first storage stores play time information indicating respective play times of the plurality of individual movie files, and
    the calculating task calculates the total play time of the acquired individual movie files, based on the play time information stored in the first storage.

4. The image processing apparatus according to claim 1, wherein the displaying task displays on the display the current play time together with the total play time.

5. The image processing apparatus according to claim 1, wherein the detecting task detects a state in which replacement of a predetermined toner container is necessary as a maintenance event.

6. The image processing apparatus according to claim 5, wherein the acquiring task acquires at least a movie file indicating the procedure of opening a toner cover to expose a mount portion of the predetermined toner container, one or more movie files indicating the procedure of replacing the predetermined toner container, and a movie file indicating the procedure of closing the toner cover, in response to the detecting task detecting the state in which the replacement of the predetermined toner container is necessary.

7. The image processing apparatus according to claim 1, wherein the detecting task detects occurrence of a jammed sheet as a maintenance event.

8. The image processing apparatus according to claim 7, wherein the acquiring task acquires at least a movie file indicating the procedure of opening a cover to expose a portion of the jammed sheet, one or more movie files indicating the procedure of removing the jammed sheet, and a movie file indicating the procedure of closing the cover, in response to the detecting task detecting the occurrence of the jammed sheet.

9. The image processing apparatus according to claim 1, further comprising a scanner device configured to read an image on a document to generate image data.

10. The image processing apparatus according to claim 9, further comprising a printer configured to print based on the read image data.

11. The image processing apparatus according to claim 1, wherein the combinations of the individual movie files have a common movie file for showing a predetermined operation work, wherein the predetermined operation work is to be performed as a part of procedures to resolve the detected maintenance events corresponding to the combinations, and wherein the individual movie files are played to show a set of operations works including the predetermined operation work, and the set of operations works is for resolving the detected maintenance event.

12. The image processing apparatus according to claim 1, wherein the plural sets of combinations of individual movie files to be played stored in the second storage include:
 a first set associated with maintenance identifying information identifying a first maintenance event and including a first individual movie file, a second individual movie file, and a third individual movie file, and
 a second set associated with maintenance identifying information identifying a second maintenance event different from the first maintenance event and including the first individual movie file, a fourth individual movie file, and the third individual movie file,
 wherein the first individual movie file in the first set and in the second set is the same movie file, the third individual movie file in the first set and in the second set is the same movie file, and the second individual movie file in the first set is a different movie file than the fourth individual movie file in the second set.

13. The image processing apparatus according to claim 12, wherein in response to detection of the first maintenance event, the first individual movie file, the second individual movie file, and the third individual movie file are acquired and displayed on the display in order as the series of movies, and in response to detection of the second maintenance event, the first individual movie file, the fourth individual movie file, and the third individual movie file are acquired and displayed on the display in order as the series of movies.

14. A method of controlling an image forming apparatus, the method comprising:
 a first storing step of storing, in a first storage, a plurality of individual movie files prepared for each of operation works to be performed on the image forming apparatus by a user;
 a second storing step of storing, in a second storage, information indicating plural sets of combinations of individual movie files to be played and information indicating an order of play of respective individual movie files of each set of combinations of the plural sets of combinations, wherein each set of combinations of the plural sets of combinations is associated with maintenance identifying information for identifying a single maintenance event;
 a detecting step of detecting occurrence of a maintenance event based on signals obtained from a sensor;
 an acquiring step of acquiring the individual movie files to be played from among the plurality of individual movie files stored in the first storage and acquiring a total number of the individual movie files to be played, based on the information indicating the set of combinations of the individual movie files stored in the second storage in association with the maintenance identifying information for identifying the detected maintenance event;
 a determining step of determining whether a value of a counter is equal to the total number of the individual movies files to be played after an end of replay of each individual movie file of the acquired individual movie files, and incrementing the value of the counter after the end of replay of each individual movie file of the acquired individual movie files when it is determined that the value of the counter is not equal to the total number of the individual movies files to be played; and
 a displaying step of displaying on a display the acquired individual movie files as a series of movies in order according to the stored order of play of the acquired individual movie files together with a total play time of the acquired individual movie files, the displaying of the acquired individual movie files as the series of movies ending when it is determined that the value of the counter is equal to the total number of the individual movies files to be played.

15. A non-transitory computer-readable storage medium storing a program executable by a computer to implement a method of controlling an image forming apparatus, the method comprising:
 a first storing step of storing, in a first storage, a plurality of individual movie files prepared for each of operation work to be performed on the image forming apparatus by a user;
 a second storing step of storing, in a second storage, information indicating plural sets of combinations of individual movie files to be played and information indicating an order of play of respective individual movie files of each set of combinations of the plural sets of combinations, wherein each set of combinations of the plural sets of combination is associated with maintenance identifying information for identifying a single maintenance event;
 a detecting step of detecting occurrence of a maintenance event based on signals obtained from a sensor;
 an acquiring step of acquiring the individual movie files to be played from among the plurality of individual movie files stored in the first storage and acquiring a total number of the individual movie files to be played, based on the information indicating the set of combinations of the individual movie files stored in the second storage in association with the maintenance identifying information for identifying the detected maintenance event;
 a determining step of determining whether a value of a counter is equal to the total number of the individual movies files to be played after an end of replay of each individual movie file of the acquired individual movie files, and incrementing the value of the counter after the end of replay of each individual movie file of the acquired individual movie files when it is determined that the value of the counter is not equal to the total number of the individual movies files to be played; and a displaying step of displaying on a display the acquired individual movie files a series of movies in order according to the stored order of play of the acquired individual movie files together with a total play time of the acquired individual movie files, the displaying of the acquired individual movie file as the series of movies ending when it is determined that the value of the counter is equal to the total number of the individual movies files to be played.

16. An image processing apparatus comprising:

a memory configured to store a plurality of individual movie files respectively representing operation works to be performed on the image processing apparatus, to store information indicating plural sets of combinations of individual movie file, among the plurality of individual movie files, to be played, and to store information indicating an order of play of respective individual movie files of each set of combinations of the plural sets of combinations, wherein each set of combinations of the plural sets of combinations is associated with maintenance identifying information identifying a single maintenance event; and a processor configured to execute computer executable instructions, thereby causing the image processing apparatus to:

detect occurrence of a maintenance event;

acquire the individual movie files in the combination of individual movie files to be played from among the plurality of individual movie files stored in the memory and acquire a total number of the individual movie files to be played, based on the information indicating the set of combinations of individual movie files to be played that s stored in association with the maintenance identifying information identifying the maintenance event, wherein the combinations of the individual movie files have a common movie file for showing a predetermined operation work;

determine whether a value of a counter is equal to the total number of the individual movies files to be played after an end of replay of each individual movie files of the acquired individual movie files, and increment the value of the counter after the end of replay of each individual movie file of the acquired individual movie files when it is determined that the value of the counter is not equal to the total number of the individual movies files to be played;

display on a display the acquired individual movie files as a series of movies in order according to the stored order of play of the acquired individual movie files, the display of the acquired individual movie file as the series of movies ending when it is determined that the value of the counter is equal to the total number of the individual movies files to be played;

display a total play time of the acquired individual movie files during the play of the acquired individual movie files;

display an object configured to receive a user's instruction for causing display of the series of movies to move from a current replay position to a different replay position including all replay positions within the total play time of the acquired individual movie files, in accordance with a movement of the object; and display, in response to a first individual movie file of the acquired individual movie files having an end determination condition stored in association with the first individual movie file, a movable range indicator that indicates a movable range within, and less then, the total play time of the acquired individual movie files, the movable range being a range in which the object configured to receive the user's instruction is limited to be moved.

17. The image processing apparatus of claim 16, wherein the processor is configured to execute computer executable instructions to further cause the image processing apparatus to obtain a sum of play times of the individual movie files in the set of combinations of individual movie files and display the obtained sum as the total play time of the acquired individual movie files during the play of the acquired individual movie files.

18. The image processing apparatus of claim 16, wherein the processor is configured to execute computer executable instructions to further cause the image processing apparatus to:

acquire a total number of the individual movie files to be played in response to the detected occurrence of the maintenance event;

determine whether a value of a counter is equal to the total number of the individual movies files to be played; and end display of the acquired individual movie files as the series of movies when it is determined that the value of the counter is equal to the total number of the individual movies files to be played.

19. The image processing apparatus of claim 16, wherein the processor is configured to execute computer executable instructions to further cause the image processing apparatus to:

determine, in response to the first individual movie file of the acquired individual movie files having the end determination condition stored in association with the first individual movie file, whether the end determination condition has been met; and replay a second individual movie file of the acquired individual movie files as the series of movies only when it is determined that the end determination condition stored in association with the first individual movie file has been met.

20. The image processing apparatus of claim 19, wherein the end determination condition stored in association with the first individual movie file is whether a right cover of the image processing apparatus is open.

21. The image processing apparatus of claim 19, wherein the end determination condition stored in association with the first individual movie file is whether a toner cover is open.

22. The image processing apparatus of claim 16, wherein the movable range in which the object configured to receive the user's instruction is limited to be moved does not extend beyond an end point of the first individual movie file.

* * * * *